US006964788B2

(12) United States Patent
Phebus et al.

(10) Patent No.: US 6,964,788 B2
(45) Date of Patent: Nov. 15, 2005

(54) SYSTEM FOR HANDLING PROCESSED MEAT AND POULTRY PRODUCTS

(75) Inventors: Randall K. Phebus, Manhattan, KS (US); Eric W. Krieger, Mentor, OH (US); James R. Marsden, Manhattan, KS (US); William J. T. Biebesheimer, Perry, OH (US); Douglas D. Danforth, Florissant, MO (US)

(73) Assignee: Steris Inc., Temecula, CA (US)

( * ) Notice: Subject to any disclaimer, the term of this patent is extended or adjusted under 35 U.S.C. 154(b) by 275 days.

(21) Appl. No.: 10/140,672

(22) Filed: May 7, 2002

(65) Prior Publication Data

US 2003/0047087 A1 Mar. 13, 2003

Related U.S. Application Data

(60) Provisional application No. 60/289,321, filed on May 7, 2001.

(51) Int. Cl.$^7$ ............................. A22C 13/00; A23B 4/14
(52) U.S. Cl. ....................... 426/335; 426/316; 426/320; 426/532
(58) Field of Search ................................ 426/129, 316, 426/320, 335, 532

(56) References Cited

U.S. PATENT DOCUMENTS

| 4,693,052 | A | * | 9/1987 | Rebmann et al. | 53/167 |
|---|---|---|---|---|---|
| 5,573,801 | A | * | 11/1996 | Wilhoit | 426/326 |
| 6,183,807 | B1 | * | 2/2001 | Gutzmann et al. | 426/652 |
| 6,620,446 | B2 | * | 9/2003 | King et al. | 426/335 |

FOREIGN PATENT DOCUMENTS

| GB | 947688 | 1/1964 |
|---|---|---|
| GB | 1570492 | 7/1980 |
| WO | WO 95/04126 | 2/1995 |
| WO | WO 95/10191 | 4/1995 |

OTHER PUBLICATIONS

Rourke, Tom. Clean Room Design and Sanitation.[online]. Feb. 22–23, 2001[retrieved Jun. 9, 2004]. Retrieved from the Internet: <URL:http://www.meatscience.org/meetings/WSC/2001/default.htm>.*

Steris. Steris Annouces Joint Post–Process Pasteurization Initiative to Combat Listeria Contamination.[online]. Jan. 28, 2000[retrieved Jun. 9, 2004]. Retrieved from the Internet: <URL:http://www.steris.com/investor/ReleaseDetail.cfm?ReleaseID=13677.*

* cited by examiner

Primary Examiner—Keith Hendricks
Assistant Examiner—Maureen C. Donovan
(74) Attorney, Agent, or Firm—Fay, Sharpe, Fagan, Minnich & McKee, LLP

(57) ABSTRACT

Food products, such as precooked meats, sausages, and the like are microbially decontaminated in their cooking packages to remove surface microorganism contamination from the packages. The cooking packages are removed and the food products optionally subjected to further processing, such as slicing, and then packaged in aseptic packaging. The microbial decontamination step, further processing and packaging are carried out in a clean room which is maintained to a high level of sterilization or disinfection to minimize or eliminate contamination of the food products with pathogenic microorganisms such as *Listeria Monocytogenes*. The food products thus leave the packaging plant with a much higher assurance of food safety than is found in a conventional packaging plant.

19 Claims, 3 Drawing Sheets

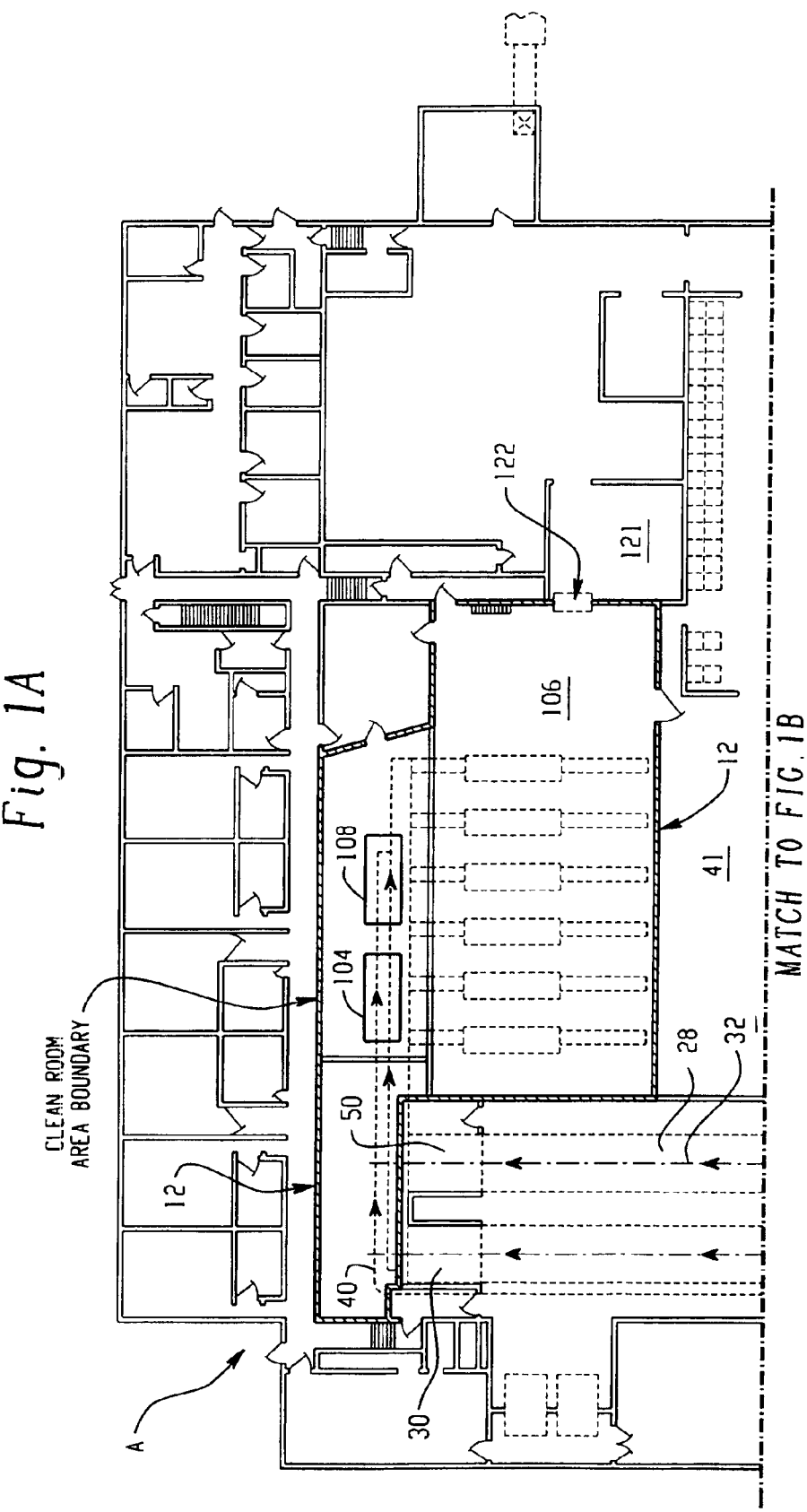

SYSTEM FOR HANDLING PROCESSED MEAT AND POULTRY PRODUCTS

This application claims the priority of U.S. Provisional Application Ser. No. 60/289,321, filed May 7, 2001.

BACKGROUND OF THE INVENTION

The present invention relates to the food processing arts. It finds particular application in conjunction with the post-pasteurization, surface microbial decontamination of hot dogs, sausages, and other processed meat and poultry products prior to packaging, and will be described with particular reference thereto.

Prevention of food poisoning is of paramount importance in the food processing industry. Concern for food safety has lead most countries to regulate the food industry heavily to minimize public health risks. Despite these efforts, food poisoning still occurs. Many instances of food poisoning are attributed to bacteria, such as *Salmonella, Clostridium*, and *Staphylococcus*, among others.

Of rising concern is the relatively recent increase in the *Listeria* contamination of poultry and processed food products, such as frankfurters, other sausages, cheese, dairy food, and seafood. Processed meat and poultry products such as frankfurters are generally cooked to destroy harmful bacteria. Of particular concern is the discovery that pasteurized and fully cooked processed foods are being contaminated with microbes, such as *Listeria monocytogenes*, following cooking or pasteurization and prior to packaging for point of sale. Such contamination is typically surface contamination and is believed to be caused by the contact of microbes with food surfaces subsequent to heat treatment. Microbes, such as *Listeria*, may be airborne (i.e., carried by dust) or present on food contacting surfaces, such as processing equipment.

Recently, several outbreaks of food poisoning have been reported in which the causative agent was suspected to be or identified as *Listeria*-contaminated food. Listeriosis is a serious disease which may cause meningitis, spontaneous abortion, and perinatal septicaemia. Although treatable with early diagnosis, untreated Listeriosis exhibits a high mortality rate. In 1998, twenty deaths were associated with a *Listeria* epidemic. Regulations now specify that food should be absolutely free of *Listeria*, any contamination is considered to be an adulteration and the food should not be placed in commerce.

Food preservation by inhibition of growth of *Listeria monocytogenes* is difficult. *Listeria* is a particularly difficult microorganism to destroy because it is heat resistant and is able to grow, even under refrigeration, in raw and cooked products. Methods for destroying the organism on raw and on processed foods have included treatments using heat, radiation, chemicals, or antibiotics. In the heat and irradiation treatments, the food products are subjected to the heat or radiation after packaging. However, the heat resistance of the organism makes it difficult to achieve complete kill through heat.

Antibiotics, such as *Streptococcus lactis*-derived or synthetic equivalent bacteriocin, such as nisin, have been used, either as a spray, or dip, or as a film on the packaging or casing which remains in contact with the food during heat treatment.

Chemicals used in treating the food products include ammonium compounds and acids such as citric, lactic, acetic, and peracetic acid, which have been used to wash down meat carcasses. With the chemical treatment methods, the carcass is placed on a conveyer system and the decontaminating chemical is sprayed over the items as they pass beneath. Liquid smoke has been used on pasteurized processed foods to inhibit recontamination after cooking.

Processed meats, such as sausages and deli meats, are usually microbially decontaminated during the cooking or smoking process. It is generally assumed that the cooked product remains free of microorganisms during the subsequent decasing, slicing, and packing stages. However, the occurrence of outbreaks of food poisoning associated with these precooked products has lead the present inventors to recognize that the cooked food products are recontaminated with pathogenic bacteria, such as *Listeria*, either through airborne contact or through contact with contaminated equipment or packaging materials.

The present invention provides for a new and improved system and process for treating food products which overcome the above-referenced problems and others.

SUMMARY OF THE INVENTION

In accordance with one aspect of the present invention, a method of treating a food product is provided. The method includes cooking the food product in a casing and transporting the cooked food product in the casing to a clean room. At the clean room, the casing on the cooked cased food product is contacted with an antimicrobial agent to microbially decontaminate the casing. The casing is removed from the microbially decontaminated cased food product and the decased food product is packaged in the clean room.

In accordance with another aspect of the present invention, an assembly for microbially decontaminating and packaging food products is provided. The assembly includes a cooker which cooks the food product, the food product being packaged in a casing prior to cooking. Spray nozzles are provided for spraying a decontaminant solution over the cased food product at a clean room to microbially decontaminate the casing. A source of the decontaminant solution is fluidly connected with the nozzles. Means are provided for removing the casing from the food product and for packaging the decased food product within the clean room.

In accordance with another aspect of the present invention, a method of treating a food product is provided. The method includes microbially decontaminating the food product in a casing by thermally cooking it and conveying the cooked food product in the casing to a clean room, conveying the cooked food product in the casing through an area in which microbes can be deposited on the casing to a clean room, the clean room having been treated to remove harmful microorganisms from food contact surfaces and air in the room. The casing is removed from the cooked product in the clean room. The method further includes at least one of the following: (1) microbially decontaminating the casing as the food product enters the clean room, and (2) microbially decontaminating a surface of the decased food product in the clean room. The microbially decontaminated decased food product is packaged in the clean room.

One advantage of the present invention is that the food product is free of pathogenic bacteria, such as *Listeria, E. coli*, and *Salmonella*.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps

DETAILED DESCRIPTION OF THE PREFERRED EMBODIMENTS

Figure 1B:
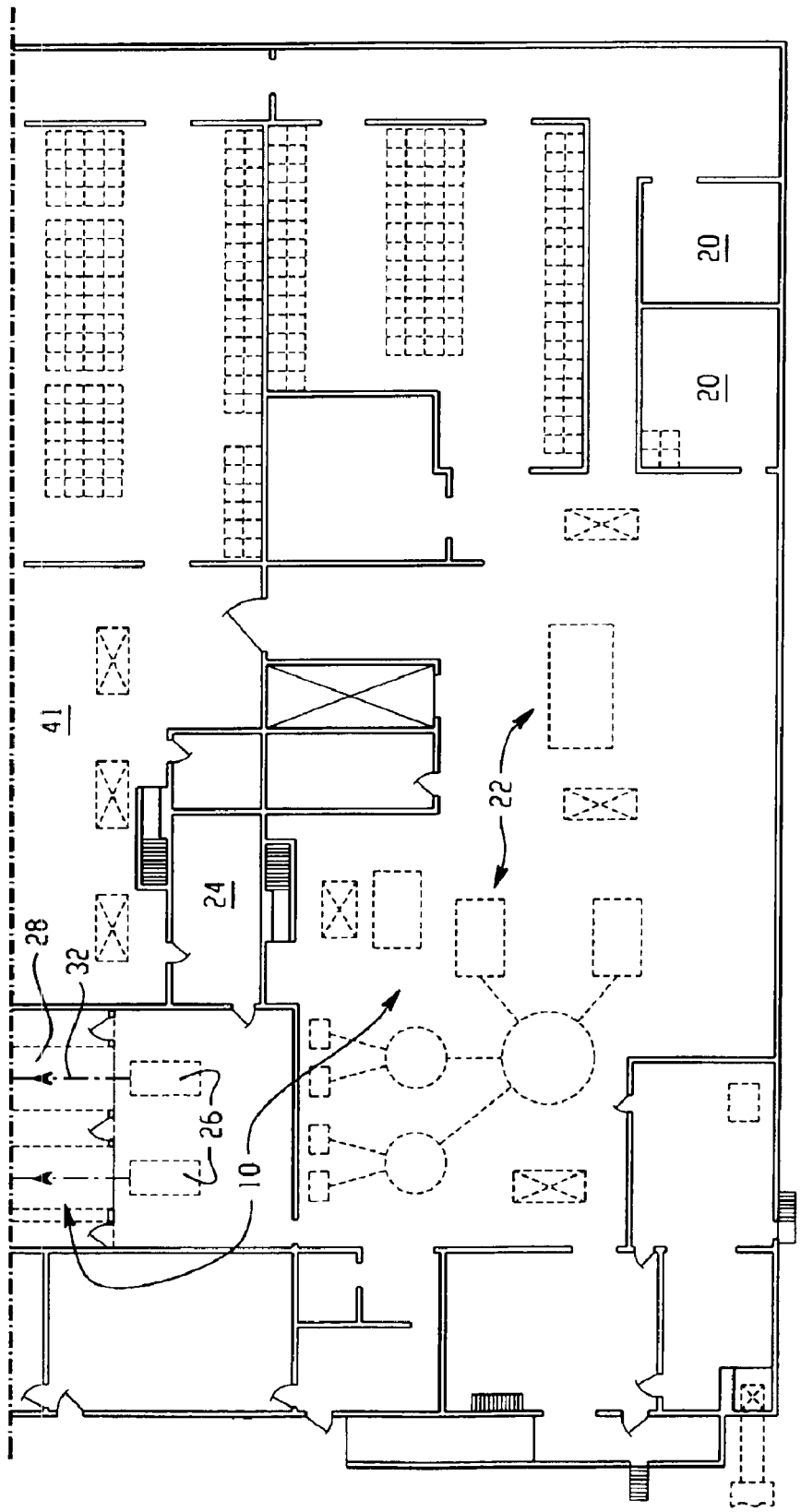
FIG. 1 is a schematic top view of a food treatment system according to the present invention.
Figure 2:
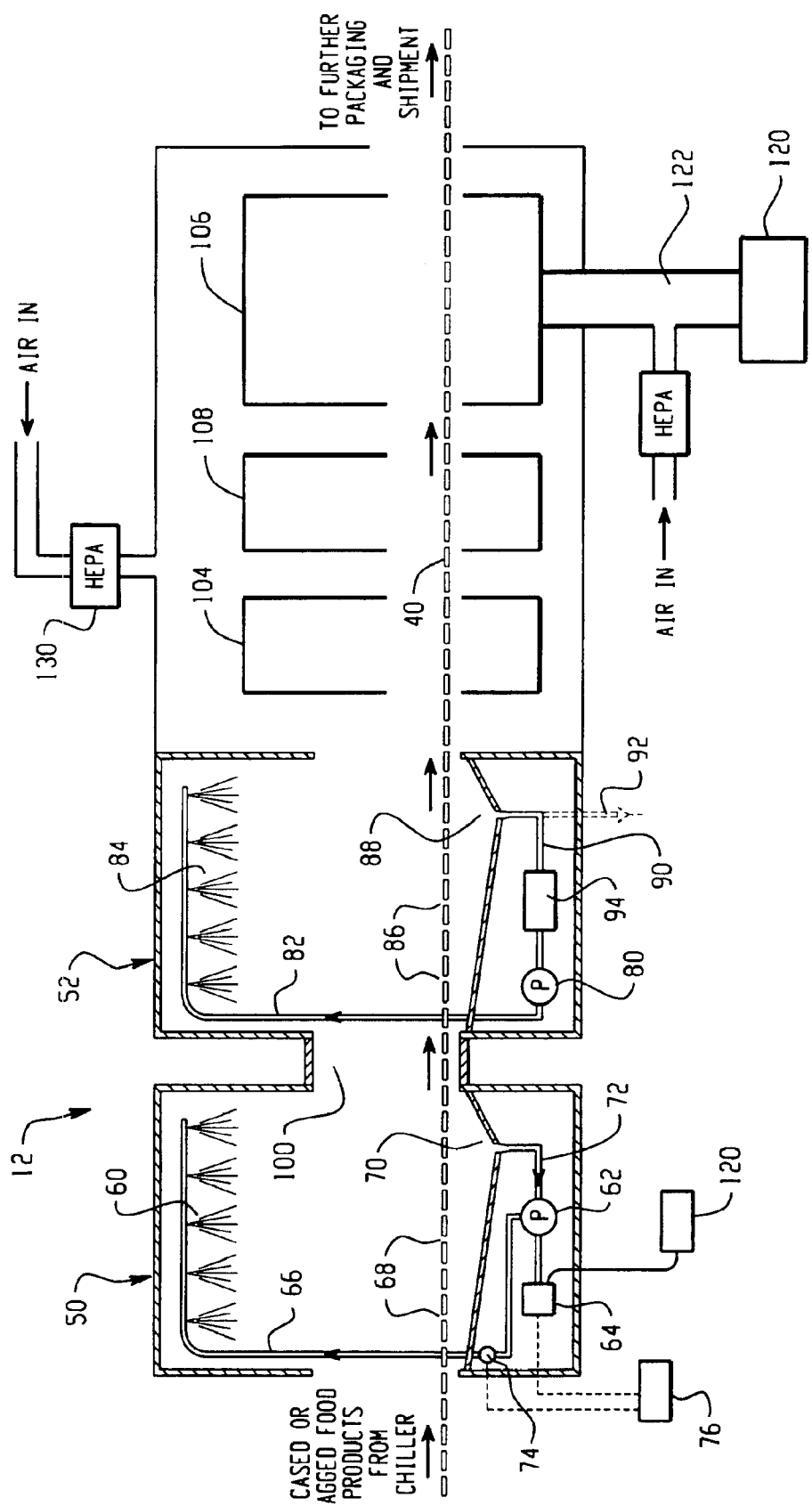
FIG. 2 is a schematic side sectional view of the food treatment system of FIG. 1.

With reference to FIGS. 1–2, a food processing system A for processing food products to remove surface contamination of microorganisms, such as *Listeria*, and maintain the products free of contamination until packaged is shown. While particular reference is made to the reduction in the species *Listeria monocytogenes* on cooked sausages, such as frankfurters, it should be appreciated that the process is also intended to remove other pathogenic and spoilage microorganisms, such as *Aeromonas hydrophila, Aerobacter butzleri, Bacillus cereus, Campylobacter jejuni, Eschericia coli, Salmonella typhimurium, Staphylococcus aureus*, and others on a variety of processed foods.

The term "decontaminate" and similar terms are used herein to encompass both disinfection and sterilization. Disinfection connotes the absence of pathogenic life forms. Sterilization connotes the absence of all life forms, whether pathogenic or not.

The system A includes a processing side 10 and a "clean" side or room 12. The environmental conditions and equipment within the clean room and the materials and people entering the clean room are carefully controlled and monitored to ensure a sterile or high level disinfection standard is maintained throughout so that the processed food products are free of pathogenic bacteria when they leave the packaging plant. Contact between the clean side 12 and the processing side 10 is kept to a minimum. Additionally, air entering the clean room is preferably filtered to remove harmful microorganisms. The room may be maintained at a slight positive pressure to reduce ingress of pathogens.

The processing side of the system includes those parts of the food processing plant which are associated with forming and cooking the processed food product. By "cooking", it is meant to include other food processing techniques which produce a product in which the interior of the food product is free, or substantially free of microorganisms, including pickling, smoking, fermenting, infrared or other radiation treatment, and the like.

A variety of food products may be processed in the system, including small cased products or sausages, larger cased logs, deli items, lunch meats, and fermented, dried or pickled products, such as corned beef, dried sausage, and the like. Small cased products, such as hot dogs, frankfurters, kielbasa, and the like, are those which are cooked in a casing sized to the individual product, which is generally removed after cooking. Large cased products, such as bologna, turkey, and meat products are also cooked in a casing, which is then removed. The cooked product is generally sliced prior to packaging. Deli items and lunch meats, such as roast beef, hams, chicken, liver cheese, pickle loaf, and other meat and poultry products, are generally cooked in a plastic or other cooking bag. The bag is then removed and the large chunks of meat or formed restructured products are repackaged prior to shipping. Lunch meats may be sliced before final packaging. The system is also useful for handling cheeses which are sliced prior to packaging and combination food packages, in which processed foods, such as meat—e.g., pepperoni sausage, bologna, cooked hamburgers, and the like, and/or cheese, are combined with other lunch items, such as crackers, pizza crusts, desert items, and so forth, in a sealed package.

In the case of processed food products which are cooked in a casing or bag, the processing side includes the areas and equipment where the food is prepared, cooked, chilled, if necessary, and the like. With reference to FIG. 1, which shows a system suited to small casing products, such as hot dogs, the processing side includes storage rooms 20 for uncooked meats, poultry, spices, and other ingredients of the sausages, grinding and mixing equipment 22, storage facilities 24 for sausage casings, casing equipment 26, cooking equipment 28, and chilling equipment 30. In the case of hot dogs, the ground meat and other ingredients are passed through the casing machine 26 where the casings are applied. The cased products are then carried by a conveyor system 32, carts, or otherwise transported to a cooker 28, such as a smoker or oven, where the sausages are cooked. From the cooker, the sausages are transported through a chilling room 30 where the cooking process is stopped and the temperature of the sausages is reduced. Large logs undergo a similar process. For deli meats, the process is also similar, the large chunks of meat being encased in plastic bags prior to cooking.

The cooked and cased or bagged products are then transported, still in their casing or cooking bag, by a conveyor system 40, or other transport system, into the clean room 12, which may be a single room or a number of interconnected rooms or passages. In the clean room 12, the food products are microbially decontaminated (preferably, while still in their protective casings or cooking bags), removed from their casings or cooking bags, sliced, or subjected to other post processing treatments, if desired, and then packaged, preferably in aseptic packaging materials which enclose the food products. The packaged products can then be taken out of the clean room 12, into further packaging or storage areas 41, where they are packed in shipping containers or the like ready for transport.

Prior to entering the clean room 12, the exterior surfaces of the casing or other cooking bag may have become contaminated with microorganisms, such as *Listeria*, for example, during the transport of the cooked product from the cooker to the conveyor 40. Such contamination may result from air-borne contaminants, or contaminants on the conveyor system, carts or transport containers, or on the equipment in the chilling room, or the like. To remove these contaminants and to make sure that the food products themselves remain free of contamination, the cased or bagged food products are preferably subjected to an antimicrobial treatment to remove any contaminants from the outer surface of the casing or bag. The antimicrobial agents employed may comprise a wide variety of chemical antibacterial or antipathogenic agents, either alone or in admixtures, which are well known and routinely used in hospitals, the food industry and consumer markets for the control of microorganisms. The selected antimicrobial treatment is preferably one which is government (e.g., FDA) approved for treatment of food and/or food-related materials. Suitable antimicrobial treatments include dipping, spraying, or otherwise contacting the cooking bag or casing with a solution containing an antimicrobial agent in sufficient quantity and for a sufficient time to ensure that the casing or bag is disinfected or sterilized. Gaseous or plasma antimicrobial agents may also be employed. Suitable antimicrobial agents include liquid and vaporized organic acids, liquid and vaporized peroxides, liquid and vaporized aldehydes, such as formaldehyde, quaternary ammonium compounds, such as quaternary ammonium bromides or chlorides, more particularly as dimethylalkyl quaternary ammonium chlorides, fatty acid pyridinium halides, such as cetyl pyridinium chloride or bromide, phenolics, ionized gases, plasmas, and combinations thereof. Other suitable agents include halogen-based agents such as for example, chlorine or iodine gas, alkalis, such as sodium or potassium hydroxides, inorganic acids, metal chlorites and hypochlorites, such as sodium or potassium chlorite or hypochlorite, chlorine dioxide, certain chloramines, chlorine trifluoride, chlorine pentafluoride, and combinations of these and other agents. Steam or hot water (greater than about 80° C.) may also be used, alone or in combination with other antimicrobial agents. Radiation, such as UV radiation may also be used, alone or in combination with other antimicrobial agents.

Suitable organic acids include carboxylic acids and carboxylic peracids. A number of carboxylic acids and carboxylic peracids can be used, including for example, $C_1$–$C_4$ carboxylic acids and $C_1$–$C_4$ carboxylic peracids, and their salts. Examples of suitable $C_1$–$C_4$ carboxylic acids include formic acid, acetic acid, propionic acid, glycolic acid, and succinic acid. Examples of suitable $C_1$–$C_4$ carboxylic peracids are those which are derived from a carboxylic acid or dicarboxylic acid by reacting the acid with hydrogen peroxide. Preferable $C_1$–$C_4$ carboxylic peracids for use in the composition include performic, peroxyacetic acid (peracetic acid), peroxypropionic acid, peroxyglycolic acid, peroxysuccinic acid, or mixtures thereof. Sodium diacetate is a suitable salt. The carboxylic acid and peracid components are commercially available, or in the case of the peracids, can be prepared by oxidation of the carboxylic acids. The acid is preferably present in an amount of from 0.0001 to about 10% by weight of the composition. A decontaminant solution containing peracetic acid has broad spectrum antimicrobial activity for treatment of exposed surfaces of processed foods and raw meats and poultry and their casings and cooking bags.

Suitable liquid and vaporized peroxides include hydrogen peroxide, alone or in combination with another antimicrobial agent, such as peracetic acid.

Examples of commercially available antimicrobial compositions include Process NPD™, a quaternary ammonium-based antimicrobial composition, and Spor-Klens™, a mixture of hydrogen peroxide, peracetic acid, and acetic acid, both obtainable from STERIS Corp., Mentor Ohio 44060, and Sanova™, an acidified sodium chlorite, available from Alcide Corporation (Redmond, WASH.). LpH-ag™ and One Stroke Environ™ are commercially-available phenolic compounds.

The antimicrobial agent is preferably selected so as to provide a wide spectrum of activity against all or commonly encountered live pathogens. The effectiveness of the antimicrobial composition selected is preferably validated at regular intervals, by taking swabs from the conveyor system 40 and or the casing or cooking bags to ensure that the processing conditions used are meeting the selected disinfection or sterilization standards.

The concentration of the antimicrobial agent in the composition and the exposure time are preferably sufficient to provide for the total destruction of the pathogenic organisms on the surface. The concentration of the antimicrobial agent may vary, however, generally the concentration should be at least as great as, or typically more than sufficient to provide for the destruction of all the suspected pathogenic organisms.

In a preferred embodiment, the conveyor system 40 carries the food products in their casing or cooking bags, into a first chamber or area 50 of the clean room 12, where the food products are sprayed with a decontaminant solution containing one or more antimicrobial agents, or contacted with steam or hot water. The conveyor system 40 then optionally carries the sprayed food products into a second chamber 52 or area of the clean room 12 where a rinse fluid is sprayed over the food products.

Fluid outlets 60, such as multiple spray nozzles, in the first chamber 50 spray the decontaminant solution over the food product's casings or bags. The spray nozzles are preferably arranged so that all surfaces of the food product's casings or bags are contacted with the decontaminant solution. The spray nozzles may be arranged at the sides, above, and or below the processed food passing by. Alternatively, or additionally, the conveyor system 40 rotates the food products as they pass by the nozzles 60 so that all surfaces are contacted.

A pump 62 pumps the decontaminant solution from a reservoir 64 to the spray nozzles through a supply line 66. Sprayed decontaminant solution drips through openings 68 in the conveyor system and collects in a sump 70 at the base of the chamber 50. Preferably, the pump withdraws the collected decontaminant solution from the sump through a return line 72 and recycles it through the spray nozzles 60.

Periodically, the decontaminant solution is replaced or replenished with fresh decontaminant solution from the reservoir 64 and the used decontaminant is carried to a drain or otherwise disposed. Additionally, or alternatively, a sensor 74 detects the peracetic acid concentration (or that of one or more other antimicrobial agents) of the circulating decontaminant solution. A controller 76 receives signals from the sensor 74. When the peracetic acid concentration drops below a predetermined level, the controller 76 causes additional peracetic acid to be supplied from the reservoir 64 to raise the peracetic acid concentration in the decontaminant solution flowing to the nozzles 60.

The second chamber 52 is similar to the first chamber 50 except in that a rinse fluid is sprayed over the food products in place of the decontaminant solution to remove substantially all of the peracetic acid from the food products. Specifically, a second pump 80 pumps the rinse fluid through a supply line 82 to nozzles 84 or other fluid outlets in the second chamber 52. The sprayed rinse fluid passes through apertures 86 in the conveyor system and collects in a sump 88 at the bottom of the second chamber 52. The sprayed rinse fluid is returned to the pump 80 through a return line 90. Alternatively, the return line 90 directs the sprayed rinse fluid directly to a drain 92. The rinse fluid may be water or a sanitizing or disinfecting composition.

Preferably, the rinse fluid comprises sterile water, which is free of all harmful microorganisms. A source of sterile water 94, such as a sterile water generator, preferably receives tap water and destroys harmful bacteria in the water, for example, by heating the water to a sufficient temperature to destroy the harmful bacteria and then cooling the water to a suitable temperature for rinsing. The sterile water is then pumped from the source 94 to the supply line 82 by the pump 80.

The chambers 50, 52 are aseptically connected with each other by a conduit 100 such that microorganisms are inhibited from recontaminating the food between the stages.

Optionally, both the decontamination and rinsing steps may be carried out in the same chamber or area of the clean room 12. The food products are carried to a casing/cooking bag removal machine 104 (termed a "peeler" in the case of small and large casing products) where they are stripped from their casing/cooking bags prior to aseptic packaging in aseptic packing materials in a packaging area 106 of the clean room, equipped with packaging machines. Optionally, the peeled or debagged food product may undergo further processing in a processing station 108 prior to packaging. For large logs, lunch meats and the like, in particular, a slicing machine 108 slices the food product into slices.

The now-packaged food products may then be transported out of the clean room into the secondary packaging area 41, where the packaged food products are packed in secondary packaging, such as cartons, ready for shipment.

Optionally, the rinse step and rinse chamber 52 are eliminated. If peracetic acid is used in the decontaminant solution, it rapidly degrades over a period of a few hours to non-harmful products, such as acetic acid and water, and thus traces of the decontaminant solution which may get onto on the food products are not harmful to consumers. Acetic acid (vinegar) is a common additive in many food products and is not harmful. Any remaining peracetic acid on the casing or cooking bag degrades to harmless products by the time packaged food products reach the store shelves or the ultimate consumer.

It should be appreciated that the decontaminant solution is also suited to other methods of treatment of food products, such as dipping or immersing in the solution.

The decontaminant solution preferably contains from about 500 to about 4,000 ppm of peracetic acid. The optimal concentration depends on the length of time to which the food products are exposed to the decontaminant solution and on the temperature of the decontaminant solution. For example, a six log reduction (a reduction in the number of microorganism by a factor of $10^6$) can be achieved by contacting the surfaces of the casing or cooking bag with a 1,000 ppm peracetic acid solution for 12 seconds at 8° C. For ensuring complete elimination of resistant microorganisms, such as Listeria, longer times and/or higher peracetic acid concentrations are preferred. Preferred peracetic acid concentrations are from about 1000 to about 2,000 ppm for contact times of 30 seconds to 1 minute to ensure complete kill of *Listeria* and other undesirable microorganisms at temperatures of from about 8–20° C. Microbiological analysis procedures are carried out periodically on samples of the treated frankfurters to ensure that the conditions used are maintaining a 100% kill of *Listeria* or other selected microorganisms.

Tests with a variety of microorganisms have shown that the peracetic acid decontaminant solution has broad spectrum activity against a wide variety of pathogenic and spoilage microorganisms. Minimum inhibitory concentrations can be readily established for any specific microorganism or microorganisms to be destroyed.

The decontaminant solution may also contain other components, such as buffers, surfactants, chelating or sequestering agents, and the like, provided that these are non-toxic (i.e., specified as "food grade") or are rinsed thoroughly from the food products prior to packaging.

The peracetic acid for the decontaminant solution may be diluted from a concentrate, such as a 30–38% peracetic acid in water concentrate. In one preferred embodiment, the concentrated peracetic acid is metered into the reservoir 64 using a metering device, such as a metering pump 120. Or, the concentrated peracetic acid is provided as a measured dose. For example, a measured dose of the liquid concentrate is contained in a cup. The cup is opened, when needed, to release the contents into a dilution liquid, such as water. Optionally, the cup contains two or more compartments, with the liquid concentrate contained in one compartment and one or more of the other components of the decontaminant solution, such as buffers, surfactants, corrosion inhibitors, etc., contained in a separate compartment or compartments. The compartments are opened when the decontaminant solution is to be used, either by the user, or by an automated opening device.

In an alternate embodiment, the decontaminant solution may be formed by reaction of two or more reagents which form the peracetic acid in water. For example, an acetyl donor, such as acetyl salicylic acid, and a persalt such as a perborate are mixed in water, where they react to form the peracetic acid. In one embodiment, acetyl salicylic acid and sodium metaborate are separately contained in a two-compartment cup, optionally together with other dry components of the decontaminant solution. The cup is opened and the contents of the two compartments are mixed with a known quantity of water in the reservoir 64 to form the decontaminant solution.

In yet another alternate embodiment, peracetic acid is generated electrolytically and supplied to reservoir 64.

The water for forming the decontaminant solution may be tap water or treated water, such as distilled, filtered or sterile water. optionally, all or part of the water may be replaced by other solvents.

The terms "chelating agents" and "sequestering agents" are used synonymously herein to encompass inorganic and organic compounds capable of forming coordinating complexes with metals. Suitable chelating agents include, but are not limited to, ethylene diaminetetraacetic acid and its salts, cyclodextrins, hydrocarboxylic acids, such as citric acid, acetic acid, lactic acid, tartaric acid, and their salts, alone or in combination.

The decontaminant solution may also contain other antimicrobial decontaminants, such as hydrogen peroxide, citric acid, lactic acid, or acetic acid, alone, or in combination.

A preferred pH for microbial decontamination by the peracetic acid is around neutral. Accordingly, the pH of the decontaminant solution is preferably adjusted or buffered to a pH of between about 6.5 and about 7.5. Phosphate buffer systems, which are acceptable in food processing, are suitable buffers.

In an alternative embodiment, the microbial decontamination step is carried out after the decasing/debagging step, rather than before it. In this embodiment, it is the surfaces of the sausages, large logs, deli meat, luncheon meat, etc., which are antimicrobially decontaminated. Rinsing, and/or air drying may be used after the antimicrobial treatment in this embodiment.

To maintain the processed foods in a decontaminated state, the clean room is maintained at a high level of disinfection/sterilization. This is achieved in a number of ways. Preferably all of the following steps are taken, although it will be appreciated that in some instances, where an existing plant is being retrofitted, it will not be possible to achieve all the steps.

First, the materials entering the clean room are preferably sterilized/disinfected. This includes the packaging materials used to wrap the food products. As shown in FIG. 1, a separate packaging preparation room 121, connected with the clean room by a buffer zone 122 is provided. In this room, the outer shipping containers are removed from the packaging materials and the packaging materials themselves may be subjected to sterilization/disinfection, for example a UV treatment or vapor hydrogen peroxide sterilization. The sterilized/disinfected packaging materials are then transported through the buffer zone 122, which may be a passage which is pressurized with decontaminated air, into the packaging area of the clean room.

All equipment which is kept in the clean room, including slicers, packaging equipment, conveyors, and the like, as well as walls, floors, ceilings, work surfaces, etc., is preferably subjected to periodic sterilization/disinfection to ensure that microorganisms are not transferred on to the processed foods. Movable equipment, such as fork lift trucks, tools, and the like, is preferably maintained as either clean side or dirty side equipment and is preferably not used in the clean side until it has been thoroughly decontaminated. The same decontaminants as described above for decontaminating the casings and cooking bags may be used. Additionally, other decontaminants, such as iodophors, ozone, and glutaraldehyde, which are not suited for direct food contact, may be used for cleaning some equipment, provided the decontaminant is removed before exposure to the food products, or for cleaning walls, floors etc. which do not come into contact with the food product.

In the case of slicers, and other large pieces of equipment comprising gear boxes and other fairly inaccessible components, vapor decontamination, such as with vapor hydrogen peroxide may be used. This can be achieved by decontaminating the entire clean room with the vapor or by decontaminating individual components by surrounding them with a micro-isolator, such as a movably plastic cabinet, into which the sterilizing vapor is fed. Vapor decontamination may also be useful for microbially decontaminating electronic equipment used in the clean room, or at least the exposed panels thereof.

Periodic checks are made of the equipment in the clean room are made to ensure that microbial standards are being maintained.

Second, the people entering the clean room preferably maintain higher standards of antimicrobial precautions than other workers in the plant and do not enter the processing side of the plant and return to the clean room without undergoing re-decontamination. It is preferred that these workers are used solely in the clean side of the plant in a normal work shift and do not perform tasks in the processing side. Prior to entering the clean room, the clean side employees enter a gowning room where they scrub down using an antimicrobial handwash composition (e.g., a triclosan, chlohexidine digluconate, or alcohol-based composition), and don protective clothing, including gloves, gowns, bootees, face masks, head covering, and the like, which has been antimicrobially decontaminated prior to use. Shoes may go through an antimicrobial foot bath. After leaving and prior to returning to the clean room, these precautions are preferably repeated. Automated processing techniques, which keep human contact with the processed foods to a minimum, are preferably used.

Third, the air inside the clean room is preferably sterilized/disinfected by passing through a filter, such as a HEPA filter. Recirculation of the air through the filter or continuous addition of fresh, filtered air ensures that any airborne pathogens which do enter the room are quickly carried away. The air in the clean room is maintained at a positive air pressure to limit or eliminate the ingress of air from outside. Preferably, there are as few doors and passages connecting the clean side with the processing side as possible to limit the flow of air from moving between the two and to discourage workers from entering the processing side.

Fourth, frequent validation procedures, such as microbial tests are carried out to make sure that the antimicrobial standards are being met. Samples of food products, swabs from equipment, and the like are taken and analyzed for microorganisms. The presence of even single *Listeria* bacteria are indicative that food products may be contaminated and efforts are taken to ensure that preferably no *Listeria*, or other harmful bacteria are present.

Workers at the plant are preferably trained so that the importance of maintaining these food safety precautions are met. To ensure that validation processes are being conducted properly and at the desired frequency, it may be desirable to employ a validation service outside of the company to undertake some or all of the validation checks or to review validation results.

As discussed earlier, the clean room may comprise several clean rooms or areas, which are linked by passages. All of the smaller clean rooms or isolators and passages between them are maintained to the clean room conditions. A number of clean rooms may be preferable to one large room, each with its own air filtration system, being easier to regulate the environment.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of treating a food product comprising:
   cooking the food product in a casing to microbially decontaminate the food product;
   transporting the cooked food product in the decontaminated casing through non-sterile regions;
   contacting the casing on the cooked cased food product with a antimicrobial agent in the form of a liquid or spray to microbially decontaminate the casing as the cooked food product enters the clean room;
   removing the casing from the microbially decontaminated cased food product in the clean room; and
   packaging the decased food product in the clean room.

2. The method of claim 1 further including:
   rinsing the microbially decontaminated cased food product to remove the antimicrobial agent.

3. The method of claim 1 wherein the step of contacting the casing on the cooked cased food product with an antimicrobial agent includes:
   spraying a solution of the antimicrobial agent onto the casing.

4. The method of claim 3, wherein the step of spraying includes:
   transporting the cased food product on a conveyor system past spray nozzles which spray the solution of the antimicrobial agent.

5. The method of claim 1 wherein the antimicrobial agent is selected from the group consisting of liquid and vaporized organic acids, liquid and vaporized peroxides, liquid and vaporized aldehydes, quaternary ammonium compounds, fatty acid pyridinium halides, phenolics, ionized gases, plasmas, chlorine gas, iodine gas, alkalis, inorganic acids, metal chlorites, metal hypochlorites, chlorine dioxide, chloramines, chlorine trifluoride, chlorine pentafluoride, steam, water at a temperature of over 80° C., radiation, and combinations thereof.

6. The method of claim 5, wherein the antimicrobial agent includes an organic acid selected from the group consisting of carboxylic acids, carboxylic peracids, and combinations thereof.

7. The method of claim 6, wherein the organic acid is selected from the group consisting of $C_1$–$C_4$ carboxylic acids, $C_1$–$C_4$ carboxylic peracids, and salts thereof.

8. The method of claim 7, wherein the organic acid includes a $C_1$–$C_4$ carboxylic peracid selected from the group consisting of performic acid, peracetic acid, peroxypropionic acid, peroxyglycolic acid, peroxysuccinic acid, and mixtures thereof.

9. The method of claim 8, wherein the organic acid includes peracetic acid.

10. The method of claim 9, wherein the organic acid is present in solution in an amount of from 0.0001 to about 10% by weight of the solution.

11. The method of claim 10, wherein the solution further includes at least one of surfactants and chelating agents.

12. The method of claim 1 wherein the antimicrobial agent includes a peracetic acid solution, the peracetic acid in the solution being at a concentration of from about 1000 to about 4000 ppm.

13. The method of claim 1 wherein air entering the clean room is filtered to remove harmful microorganisms.

14. The method of claim 1 wherein the clean room is maintained at a positive pressure using sterile or disinfected air.

15. The method of claim 1 wherein the food product includes a sausage.

16. The method of claim 1 wherein the steps of removing the casing from the microbially decontaminated cased food product and packaging the decased food product are carried out in the clean room.

17. A method of treating a food product comprising:

cooking the food product in a casing;

transporting the cooked food product in the casing to a clean room;

at the clean room, contacting the casing on the cooked cased food product with an antimicrobial agent to microbially decontaminate the casing, the step contacting including:

spraying the cased food product with a peracetic acid solution at a concentration of from about 1000 to about 4000 ppm for a period of from about 10 seconds to 5 minutes;

removing the casing from the microbially decontaminated cased food product in the clean room; and packaging the decased food product in the clean room.

18. The method of claim 17, wherein the step of contacting includes:

spraying the cased food product with the peracetic acid solution for a period of from about 1 to 2 minutes.

19. A method of treating a food product comprising: microbially decontaminating the food product in a casing thermally by cooking; conveying the cooked food product in the casing through an area in which microbes can be deposited on the casing to a clean room, the clean room having been treated to remove harmful microorganisms from food contact surfaces and air in the room;

microbially decontaminating the casing as the food product enters the clean room;

removing the casing from the cooked product in the clean room and packaging the microbially decased food product in the clean room.

* * * * *